United States Patent [19]
Akiyama

[11] 3,961,339
[45] June 1, 1976

[54] AUTOMATIC EXPOSURE CONTROL MEANS FOR SINGLE-LENS REFLEX CAMERA

[75] Inventor: Kazuhiro Akiyama, Omiya, Japan
[73] Assignee: Fuji Photo Optical Co., Ltd., Omiya, Japan
[22] Filed: Apr. 8, 1974
[21] Appl. No.: 458,897

[30] Foreign Application Priority Data
June 19, 1973 Japan.............................. 48-68890

[52] U.S. Cl. .................................. 354/29; 354/43; 354/45; 354/152; 354/272
[51] Int. Cl.² ........................................ G03B 7/14
[58] Field of Search ................ 354/26, 29, 30, 36, 354/38, 40, 43, 45, 48, 50, 270–274, 152, 156

[56] References Cited
UNITED STATES PATENTS

| | | |
|---|---|---|
| 3,416,421 | 12/1968 | Biedermann et al............. 354/43 X |
| 3,503,313 | 3/1970 | Kuramoto............................. 354/50 |
| 3,611,893 | 10/1971 | Starp..................................... 354/29 |
| 3,715,964 | 2/1973 | Tenkumo et al..................... 354/152 |

Primary Examiner—L. T. Hix
Assistant Examiner—James LaBarre

[57] ABSTRACT

Both the shutter speed and the diaphragm opening are selected in accordance with the exposure value measured by an exposure meter. A step cam plate is brought into engagement with the pointer of the exposure meter and the amount of movement of the step cam plate is determined by the position of the pointer. The step cam plate is associated with an exposure control ring which controls the diaphragm and the shutter speed. The exposure control ring is locked in its position during the exposure operation by means of a lock lever which is put into engagement with the exposure control ring when the mirror is swung up.

10 Claims, 2 Drawing Figures

AUTOMATIC EXPOSURE CONTROL MEANS FOR SINGLE-LENS REFLEX CAMERA

BACKGROUND OF THE INVENTION

1. Field of the Invention

This invention relates to an automatic exposure control means for a single-lens reflex camera, and more particularly to an automatic exposure control means in which both the shutter speed and the diaphragm are controlled to obtain the optimum combination thereof relative to the quantity of light passing through the taking lens of the single-lens reflex camera.

2. Description of the Prior Art

Various automatic exposure control means have been proposed for controlling the shutter or diaphragm of a single-lens reflex camera. Among these conventional automatic exposure control means, is an automatic exposure control means associated with an electric shutter. It has also been known in the art to control both the shutter speed and the diaphragm opening rather than to control one or the other of these. Control of this type is known as program type exposure control. Most of the program type exposure control means employing an electric shutter normally control both the diaphragm and the shutter by use of an electric circuit.

The above described program type exposure control means in which the diaphragm and the shutter are controlled by an electric circuit is disadvantageous in that the circuit is considerably complicated and various additional control means such as a magnet for controlling the diaphragm are required. Further, the above described program type exposure control means is not applicable to a single-lens reflex camera with a focal plane shutter, since the interconnection between the interchangeable lens and the camera body is very difficult.

SUMMARY OF THE INVENTION

In light of foregoing observations and description of the state of the art, it is an object of the present invention to provide an automatic exposure control means for a single-lens reflex camera in which the program type control of the shutter speed and the diaphragm opening is performed by use of a simple mechanism and a simple electric circuit.

Another object of the present invention is to provide an automatic exposure control means for a single-lens reflex camera which can be easily applied to a camera employing a focal plane shutter.

Still another object of the present invention is to provide an automatic exposure control means which can be easily applied to a single-lens reflex camera with an interchangeable lens.

A further object of the present invention is to provide an automatic exposure control means for a single-lens reflex camera in which the image observed through the viewfinder of the camera is always bright.

A still further object of the present invention is to provide an automatic exposure control means for a single-lens reflex camera in which the pointer of the exposure meter built into the camera can be used as an indicator of the exposure value observed through the viewfinder.

An additional object of the present invention is to provide an automatic exposure control means for a single-lens reflex camera in which the exposure value measured immediately before the release of the shutter is memory retained during the exposure.

In accordance with the present invention, there is provided an automatic exposure control means in which the quantity of light passing through the taking lens of the camera is detected by an exposure meter and the diaphragm opening is controlled mechanically by use of the pointer of the exposure meter and a step cam to detect the position of the pointer of the exposure meter, and the shutter speed of an electric shutter is controlled by mechanically selecting a resistor to determine the shutter speed relative to the diaphragm opening. The selection of the resistor of the electric circuit to determine the shutter speed is performed by a control member which is used to control the diaphragm opening.

As briefly summarized hereinabove, the diaphragm is controlled mechanically by use of a mechanical member associated with a step cam which detects the position of the pointer of the exposure meter, and accordingly, the electric circuit to control the shutter speed can be made in a simple circuit construction. Since the diaphragm is mechanically controlled, the interconnection between the diaphragm in the interchangeable lens and the diaphragm control means in the camera body can be made with a simple construction. Therefore, the exposure control means in accordance with the present invention is applicable to a single-lens reflex camera with an interchangeable lens. Further, in accordance with the exposure control means of this invention, it is possible to make the exposure measurement at full aperture and accordingly the image viewed through the viewfinder is always bright. Another advantage of the present invention is that the pointer of the exposure meter built into the camera can be used as an indicator appearing in the viewfinder. In addition, in this invention, an exposure control member is locked in its position in response to the swing-up of the mirror which is swung up at the time of shutter release. Therefore, the measured exposure value which is detected by the exposure control member is memory retained while the mirror is swung up, that is, during the exposure operation of the camera.

PREFERRED EMBODIMENT OF THE INVENTION

Figure 1:
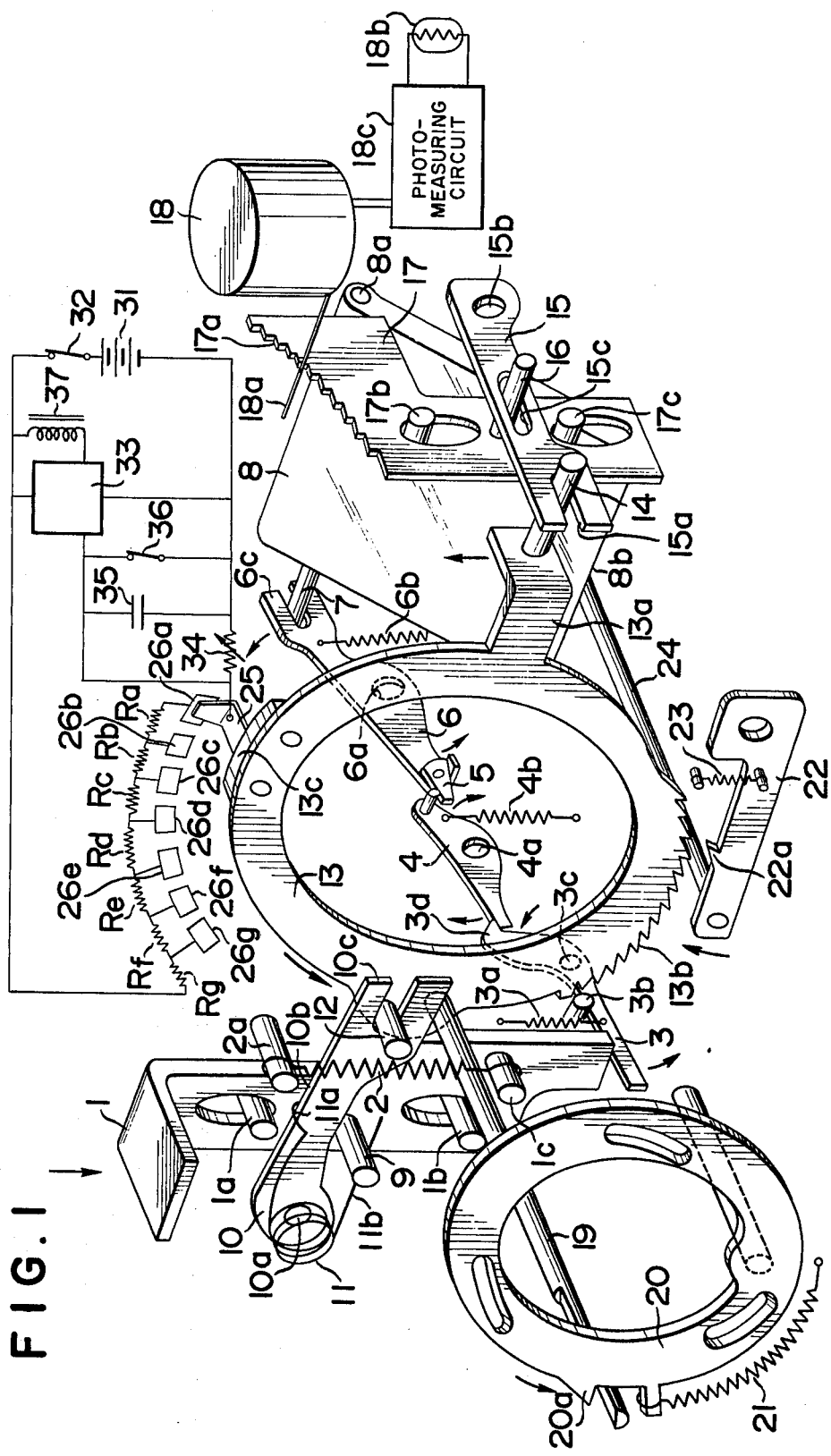
FIG. 1 is a perspective view showing the mechanical construction together with the electric circuit of the automatic exposure control means in accordance with the present invention in which the elements are in the retracted or measurement position.

Referring to FIG. 1 in which the exposure control means in accordance with the present invention is shown in the retracted position or measurement position, a shutter release member 1 to be moved down by a shutter release button (not shown) is slidably provided in the camera to be guided up and down by a pair of pins 1a and 1b. The shutter release member 1 is urged upwards by means of a tension spring 2 tensioned between a pin 1c fixed on the release member 1 and a pin 2a fixed in the camera. The shutter release member 1 is associated with a leading shutter curtain release member (not shown) for releasing a focal plane shutter of the camera. The mechanism for starting the leading shutter curtain of a focal plane shutter is well known in the art and not directly related with the present invention. Therefore, a detailed description thereof is omitted here. The lower end of the shutter release member 1 is engaged with a mirror lock lever 3 which is urged to rotate clockwise by means of a tension spring 3a and stopped in its rotation by a stopper pin 3b. The mirror lock lever 3 is pivotally mounted on a pivot 3c and has a locking end 3d which in turn is engaged with an intermediate lever 4. The intermediate lever 4 is pivotally mounted on a pivot 4a and urged to rotate clockwise by means of a tension spring 4b. The intermediate lever 4 is further engaged with an auxiliary lever 5 mounted to an end of a mirror swing-up lever 6 so that the clockwise rotation of intermediate lever 4 moves the mirror swing-up lever 6 in the swing-up direction. The mirror swing-up lever 6 is pivotally mounted to a pivot 6a and urged to rotate clockwise by means of a tension spring 6b. The mirror swingup lever 6 has a forked end 6c which is engaged with a pin 7 fixed to a swing-up mirror 8 of the single-lens reflex camera. The swingup mirror 8 is pivotally mounted to a shaft 8a so as to be swung up about the shaft 8a when the pin 7 is moved up by the forked end 6c of the mirror swing-up lever 6. Said tension spring 6b acts to return the mirror 8 to the reflecting position illustrated in the drawing after the exposure. Since the mechanism to swing up the mirror and quickly return the same is well known in the art as a mirror quick return mechanism, the detailed description of the same is omitted here.

The shutter release lever 1 is further provided with a pin 9 and is associated with an interconnecting lever 10 which is urged to be in contact with the pin 9 by means of a spring 11. The interconnecting lever 10 is pivotally mounted on a pivot 10a and one end 11a of said spring is engaged with the upper side edge 10b of the lever 10 and the other end 11b of said spring is engaged with said pin 9 to hold the lever 10 in contact with the pin 9. The interconnecting lever 10 has a forked end 10c engaged with a pin 12 of an exposure control ring 13. The exposure control ring 13 is rotatably provided in the camera and associated with a diaphragm control means and the shutter speed control means as described in detail hereinafter. Said pivot 10a of the interconnection lever 10 is fixed to a part of the camera body and the exposure control ring 13 is also mounted to the camera body so that the exposure control ring 13 may be rotated counterclockwise by the downward movement of the forked end 10c of the lever 10, that is, by the clockwise rotation of the lever 10. Since the lever 10 is urged to be in contact with the pin 9 fixed to the shutter release member 1, the lever 10 is rotated clockwise by moving the release member 1 downward. Therefore, the exposure control ring 13 is rotated counterclockwise by moving downward the shutter release member 1, that is, by depressing the shutter release button (not shown).

The exposure control ring 13 is provided with an arm 13a projecting radially on the periphery thereof. The arm 13a has a pin 14 which is engaged with a forked end 15a of a diaphragm control lever 15 which in turn is pivotally mounted on a pivot 15b. The diaphragm control lever 15 is provided with an elongated hole 15c which is engaged with a pin 16 fixed to a step cam plate 17. The step cam plate 17 is provided with steps 17a on the top end thereof to detect the position of the pointer 18a of an exposure meter 18. The step cam plate 17 is slidably guided up and down by a pair of pins 17b and 17c. As the step cam plate 17 moves up and down, said diaphragm control lever 15 is rotated clockwise and counterclockwise by the engagement of the pin 16 and the elongated hole 15c. The amount of the upward movement of the step cam plate 17 is determined by the position of the step 17a which is engaged with and stopped by the pointer 18a of the exposure meter 18. Accordingly, the amount of the upward movement of the step cam plate 17 is determined by the position of the pointer 18a of the exposure meter 18, that is, by the quantity of light received by the exposure meter 18, namely, by the quantity of light passing through the taking lens of the camera.

The exposure control ring 13 is further provided with a diaphragm holding rod 19 which extends axially to a diaphragm operating ring 20 and is engaged with a projection 20a of the diaphragm operating ring 20 to hold the rotation thereof. The diaphragm operating ring 20 is urged by a tension spring 21 in the counterclockwise direction to stop down the diaphragm. The counterclockwise rotation of the diaphragm operating ring 20 is prevented by the diaphragm holding rod 19 engaged with the projection 20a provided by the periphery thereof. When the exposure control ring 13 is not moved by the interconnecting lever 10, that is, when the shutter release lever 1 is not moved downward, the diaphragm holding rod 19 is in such a position as to keep the diaphragm operating ring 20 in the position to fully open the diaphragm. The diaphragm operating ring 20 is associated with the diaphragm in the lens barrel by a well known conventional interlocking mechanism and is rotatably mounted in the lens barrel to vary the diaphragm opening by the rotation thereof.

The exposure control ring 13 is further provided with a serrated portion 13b on the periphery thereof which is to be engaged with a pawl 22a of an engaging lever 22 which is in turn pivotally mounted on a pivot and urged in the clockwise direction by a tension spring 23. The engaging lever 22 is provided with a rod 24 extending axially under the swing-up mirror 8. The axially extending rod 24 is moved downward by the lower end 8b of the mirror 8 when the mirror is returned to the reflecting position, and moved upwardly by the force of the tension spring 23 when the mirror 8 is swung up. Thus, the pawl 22a of the engaging lever 22 is engaged with the serrated portion 13b of the exposure control ring 13 when the mirror 8 is swung up and is separated from the ring 13 when the mirror 8 is returned to its reflecting position as shown in FIG. 1.

The exposure control ring 13 is further provided with a sliding contact 25 attached thereto via an insulating member 13c. The sliding contact 25 is slidable on a series of contacts 26a to 26g which are connected with a series of resistors $Ra$ to $Rg$, respectively. The series of contacts 26a to 26g is connected with an electric current including an RC circuit the time constant of which is changed by sliding the sliding contact 25 on the series of contacts 26a to 26g for controlling the shutter speed of an electric shutter. The composite resistance of the series of resistors Ra to Rg is changed by sliding the sliding contact 25 on the contacts and changing the total number of the resistors connected with the electric circuit. The composite resistance of the resistors Ra to Rg is determined by the position of the sliding contact 25 and accordingly by the angle of rotation of the exposure control ring 13.

The electric circuit for controlling the electric shutter is of the well known conventional type and includes a power source 31, a power switch 32, a switching circuit 33, a variable resistor 34 connected in series with said series of resistors $Ra$ to $Rg$ by way of the sliding contact 25, a capacitor 35 connected in parallel with the variable resistor 34, a timing switch 36, and a magnet 37 for releasing the trailing shutter curtain of the focal plane shutter. The power switch 32 is closed in response to the release of the shutter. The variable resistor 34 is controlled to put the film speed information into the circuit. As is well known in the art, the exposure time is determined by the resistance connected with the switching circuit 33, that is, by the composite resistance of the series of resistors $Ra$ to $Rg$ connected with the sliding contact 25.

Figure 2:
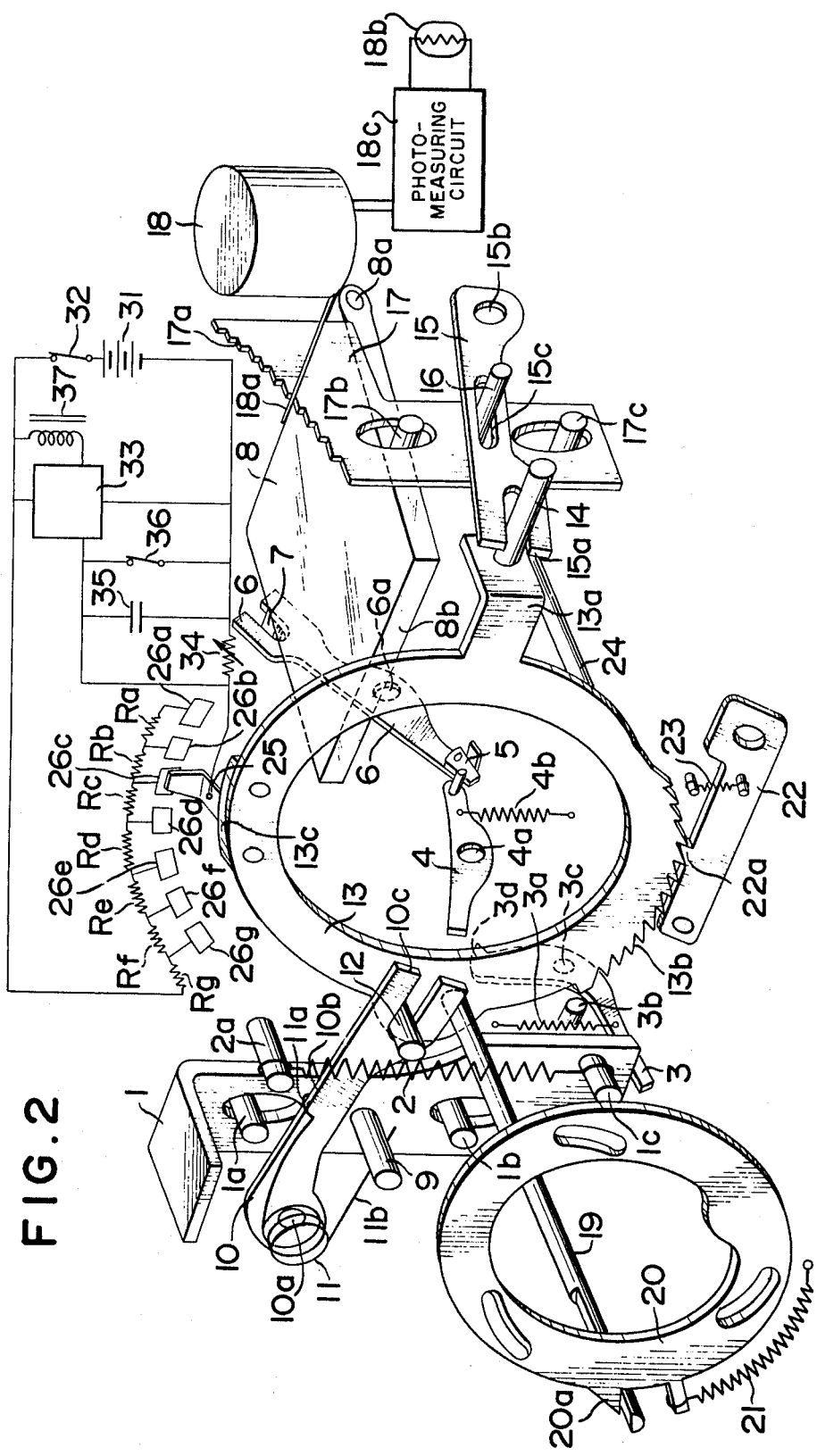
FIG. 2 is a perspective view similar to FIG. 1 in which the elements are in the working or shutter release position.

In the operation of the above described embodiment of the present invention, the shutter release member 1 is moved downward upon depression of the shutter button (not shown). When the shutter release member 1 is moved down, the interconnecting lever 10 is also moved down together with the release member 1 by the force of the spring 11. More exactly, the interconnecting lever 10 is rotated clockwise. By the clockwise movement of the interconnecting lever 10, the exposure control ring 13 the ring 12 of which is engaged with the forked end 10c of the lever 10 is rotated counterclockwise as shown in FIG. 2. By the counterclockwise rotation of the exposure control ring 13, the diaphragm control lever 15 the forked end 15a of which is engaged with the pin 14 of the arm 13a of the exposure control ring 13 is rotated clockwise about the pivot 15b and the pin 16 engaged with the elongated hole 15c of the lever 15 is moved upward. Therefore, the step cam plate 17 is moved upward when the exposure control ring 13 is rotated counterclockwise. When the step cam plate 17 is moved upward, one of the steps 17a is brought into contact with the pointer 18a of the exposure meter 18 and stopped thereby. Since the position of the pointer 18a is determined by the quantity of light received by the exposure meter 18, the amount of the upward movement of the step cam plate 17 is also determined by the quantity of light. The exposure meter 18 is connected with a photodetector 18b provided behind the taking lens of the camera and electrically connected with a photomeasuring circuit 18c. By the rotation of the exposure control ring 13, the diaphragm holding rod 19 is moved downward to allow the counterclockwise rotation of the diaphragm operating ring 20. The amount of rotation allowed of the diaphragm operating ring 20 is determined by the amount of the upward movement of the step cam plate 17 determined by the position of the pointer 18a of the exposure meter 18, i.e. by the exposure value. Therefore, the diaphragm (not shown) associated with the diaphragm operating ring 20 is stopped down to the value proper for the exposure value measured by the exposure meter 18.

By the abutment of the step 17a on the pointer 18a, the upward movement of the step cam plate 7 and the counterclockwise rotation of the exposure control ring 13 and accordingly the clockwise rotation of the interconnecting lever 10 are all stopped. However, the shutter release member 1 is not stopped of its downward movement since the lever 10 is associated with the shutter release member 1 by way of a spring and the lever 10 is allowed to rotate counterclockwise with respect to the shutter release member 1 overcoming the force of the spring 11. Thus, the shutter release member 1 is further moved downward overcoming the tension of the spring 2. By the downward movement of the shutter release member 1, the shutter speed of the electric shutter is also determined. By the downward movement of the shutter release member 1, the exposure control ring 13 is rotated counterclockwise and the angle of rotation thereof is determined by said amount of upward movement of the step cam plate 17 stopped by the pointer 18a of the exposure meter 18. According to the angle of rotation of the exposure control ring 13, the sliding contact 25 is selectively put into contact with one of the contacts 26a to 26g to make the optimum composite resistance in the electric shutter control circuit. Thus, the exposure time is determined in accordance with the quantity of light passing through the taking lens as well as the diaphragm.

Therefore, it is possible, for instance, to obtain program combinations of the shutter speed and the diaphragm opening of seven grades for EV (exposure value) 6 to 18 such as F2 (F-number:2) and 1/15 (second), F2.8 and 1/30, F4 and 1/60, F5.6 and 1/125, F8 and 1/250, F11 and 1/500, and F16 and 1/1000 by controlling the electric shutter to obtain the seven kinds of exposure time by the composite resistance of the resistors Ra to Rg. This is possible by making the diaphragm operating ring 20 correspond to the sliding contacts 26a to 26g to obtain the combinations of F2 and $Ra+Rb+\ldots+Rg$, F2.8 and $Ra+Rb+\ldots+Rf$, F4 and $Ra+Rb+\ldots+Re,\ldots$, F11 and $Ra+Rb$, F16 and $Ra$, and making the composite resistance of these resistors give the shutter speeds of 1/15 to 1/1000. It will be understood that the resistors Ra to Rg may be formed into a variable resistor which varies the resistance thereof continuously or may be resistors to change the composite resistance thereof nonlinearly.

Further, in operation, when the shutter release member 1 is moved downward, the lower end 1d thereof pushes an end of the mirror lock lever 3 and rotates the mirror lock lever 3 counterclockwise to release the intermediate lever 4. The intermediate lever 4 is rotated clockwise by the spring 4b and rotates the mirror swing-up lever 5 counterclockwise and makes the mirror 8 swing up as shown in FIG. 2. By the swing up of the mirror 8, the rod 24 is allowed to move upward and the pawl 22a of the engaging lever 22 is brought into engagement with the serrated portion 13b of the exposure control ring 13. Therefore, the exposure control ring 13 is held in the position determined by the quantity of light passing through the taking lens immediately before the swing up of the mirror 8. Thus, the program combination of the shutter speed and the diaphragm is mechanically memorized and locked during the exposure operation. At the final stage of the swing up of the mirror 8, the leading shutter curtain of the focal plane shutter is released to start and the timing switch 36 of the electric shutter circuit is opened to start the charging of the capacitor 35 as well known in the art of the conventional electric shutter. When the exposure time has lapsed, the switching circuit 33 operates to actuate the magnet 37 to start the trailing shutter curtain. Thus, the shutter speed is controlled in accordance with the time constant of the RC circuit determined by the composite resistance of the series of resistors 26a to 26g. By the signal indicating the end of the running of the trailing shutter curtain the mirror 8 is returned to its reflecting position by the tension of the spring 6b and the lower end 8b of the swing-up mirror 8 pushes the rod 24 downward to separate the pawl 22a of the engaging lever 22 from the serrated portion 13b of the exposure control ring 13. When the shutter release member 1 is set free, the member 1 is moved upward by the tension of the spring 2 and the interconnection lever 10 is also moved upward and the exposure control ring 13 is returned to its original position as shown in FIG. 1. Accordingly, all the elements are returned to their original position as shown in FIG. 1.

It will be noted that the sliding contact need not be integrally fixed to the exposure control ring 13, but may be separately provided and mechanically associated therewith or even with the step cam plate 17 or the diaphragm control lever 16.

I claim:

1. An automatic exposure control means for a single-lens reflex camera including therein an electric shutter controlled by an electric circuit the time constant of which is determined by a resistor means connected therein and a swing-up mirror swingably mounted to swing from a reflecting position to a swing-up position upon operation of a shutter release means comprising;
   a photo-detector which receives light from the object to be photographed passing through a picture taking lens of the camera;
   an exposure meter connected with said photodetector and having a pointer which is moved in accordance with a signal from said photodetector representing the variation in the quantity of light passing through the picture taking lens and received by said photodetector;
   a step cam member movable to be in engagement with said pointer so that the position thereof when engaged with the pointer may be determined by the position of the pointer;
   a shutter release means which is operated upon depression of a shutter release button;
   an exposure control member rotatably mounted to rotate in one direction upon operation of said shutter release means and mechanically connected with said step cam member, said exposure control member associated with the shutter release means so as to be moved by the shutter release means when the shutter is released, said exposure control member being associated with said step cam member to move the step cam member into engagement with said pointer when the shutter is released;
   a diaphragm control member associated with a diaphragm to control the diaphragm opening, said diaphragm control member being operatively associated with said exposure control member thereby controlling the diaphragm opening in accordance with the position of said exposure control member;
   a shutter speed controlling means including a series of resistors provided in an exposure control circuit for determining the shutter speed, each said resistor having an electric contact, and a sliding contact mounted to said exposure control member to be selectively in contact with the electric contact of said series of resistors; and
   a locking means associated with the swing-up mirror of the camera so as to be moved into engagement with said movable member to lock the same when the mirror is swung up and be moved apart from the movable member to release the same when the mirror is returned to the reflecting position;
   whereby both the shutter speed and the diaphragm opening are selected upon release of the shutter.

2. An automatic exposure control means for a single-lens camera as defined in claim 1 wherein said diaphragm control member is associated with the diaphragm by way of said movable member.

3. An automatic exposure control means for a single-lens reflex camera as defined in claim 2 wherein said movable member is further associated with said sliding contact.

4. An automatic exposure control means as defined in claim 2 wherein said movable member is a rotatable ring which is rotated in one direction by said operating member.

5. An automatic exposure control means as defined in claim 2 wherein said movable member is provided with a diaphragm holding member which is engaged with a diaphragm operating ring urged in the direction to stop down the diaphragm opening.

6. An automatic exposure control means as defined in claim 1 wherein said movable member is provided with a serrated portion to be engaged with said locking means.

7. An automatic exposure control means as defined in claim 1 wherein said resistor means comprises a series of resistors having a series of contacts for sequentially contacting said sliding contact.

8. An automatic exposure control means as defined in claim 1 wherein said resistor means is a variable resistor which has said sliding contact to vary the resistance thereof, said sliding contact being mounted on said movable member associated with said step cam member, whereby the resistance of the variable resistor is varied by the movement of said step cam member.

9. An automatic exposure control means as defined in claim 1 wherein said movable member is associated with said operating member to be moved thereby.

10. An automatic exposure control means as defined in claim 9 wherein said movable member is associated with said operating member via a lever which is spring urged in the direction to transmit the movement of the operating member to said movable member.

* * * * *